United States Patent [19]

Sticht

[11] Patent Number: 4,768,640
[45] Date of Patent: Sep. 6, 1988

[54] FEED METHOD AND DEVICE FOR ASSEMBLY PARTS

[76] Inventor: Walter Sticht, Karl-Heinrich-Waggerl-Str. 8, Attnang-Puchheim, Austria, A-4800

[21] Appl. No.: 41,668

[22] Filed: Apr. 16, 1987

Related U.S. Application Data

[63] Continuation of Ser. No. 733,519, May 13, 1985, abandoned.

[30] Foreign Application Priority Data

May 16, 1984 [AT] Austria .................................. 1603/84
Nov. 8, 1984 [AT] Austria .................................. 3527/84

[51] Int. Cl.$^4$ ............................................. B65G 47/14
[52] U.S. Cl. ...................................... 198/396; 198/493; 414/416; 221/188; 221/211
[58] Field of Search ............... 198/380, 391, 392, 396, 198/397, 493, 578, 582, 631, 689.1, 756, 757, 953; 221/165, 188, 189, 211; 414/416; 406/75, 73

[56] References Cited

U.S. PATENT DOCUMENTS

| | | | |
|---|---|---|---|
| 1,062,503 | 5/1913 | Reid | 221/189 |
| 1,095,193 | 5/1914 | Curtis | 221/188 X |
| 1,812,501 | 6/1931 | Strobez | 221/188 |
| 3,009,560 | 11/1961 | Frazier | 198/392 |
| 3,012,651 | 12/1961 | Hawkes | 198/380 |
| 3,085,713 | 4/1963 | Reiners | 221/211 |
| 3,156,342 | 11/1964 | Brewer | 221/165 |

FOREIGN PATENT DOCUMENTS 58-144016 8/1983 Japan .................................. 198/397
2085417 4/1982 United Kingdom .

Primary Examiner—Joseph E. Valenza
Assistant Examiner—Jonathan D. Holmes
Attorney, Agent, or Firm—Kurt Kelman

[57] ABSTRACT

The invention specifies a method and a device for supplying assembly parts which adhere to or entangle with each other. Individual assembly parts are extracted from an unsorted quantity of assembly parts in a separating or singling operation. These are aligned in a predetermined position and delivered to a delivery point. A partial quantity of separated or singled assembly parts aligned in a predetermined position is formed during a scooping operation. The assembly parts of this partial quantity are extracted singly and in aligned form.

13 Claims, 3 Drawing Sheets

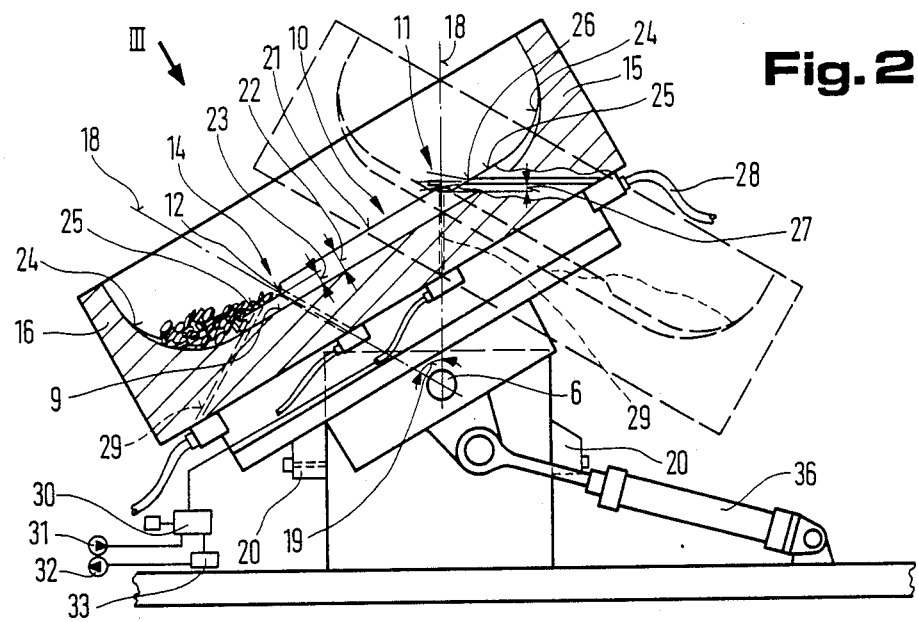
Fig. 2
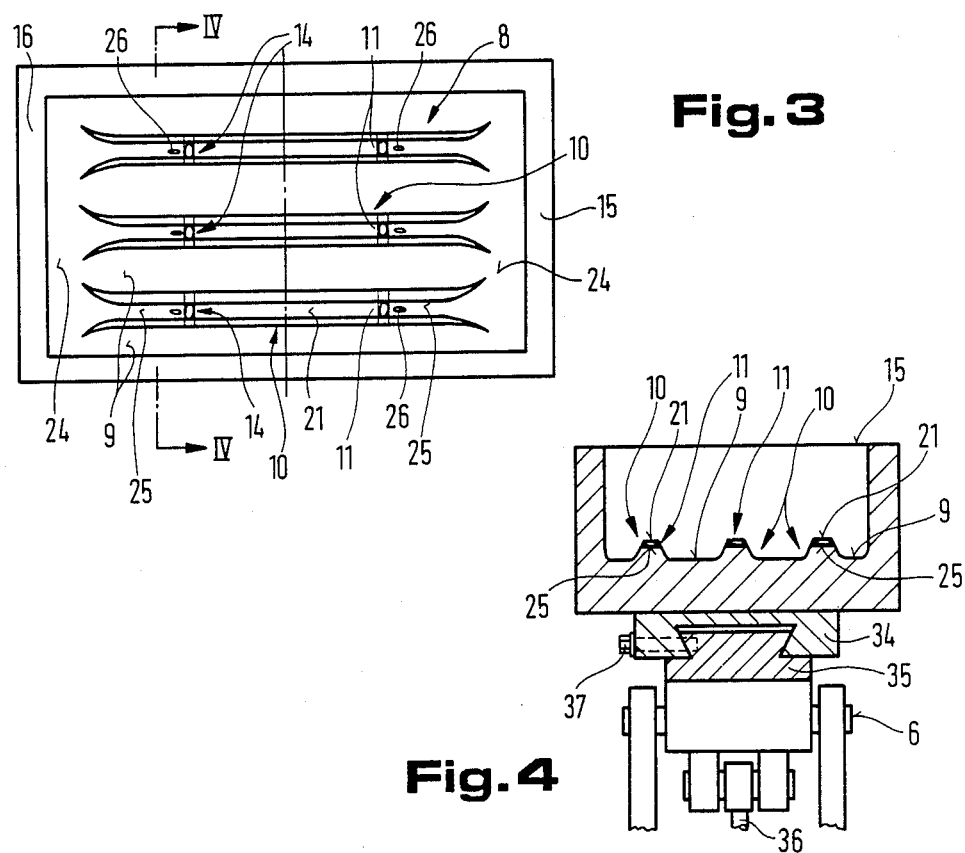
Fig. 3
Fig. 4

FEED METHOD AND DEVICE FOR ASSEMBLY PARTS

CROSS REFERENCE TO RELATED APPLICATION

This is a continuation of my copending application Ser. No. 733,519, filed May 13, 1985, now abandoned.

BACKGROUND OF THE INVENTION

1. Field of the Invention

The invention relates to a feed method and device for assembly parts which adhere to or entangle with each other, in which separate assembling parts are extracted from an unsorted stack of assembling parts during a separating operation, are aligned in a predetermined position and fed to a delivery point.

2. Description of the Prior Art

A method and device is already known for separating assembly parts entangled or adhering to each other, as disclosed by the same applicant—U.S. Pat. No. 4,063,642. In this known device, the assembly parts are split from a quantity of assembly parts contained in a storage vessel by means of an extractor device constructed as a conveyor, and fed to a post-connected final separating device. The outlet of the container and the conveying path between this outlet and a delivery point have dimensions allowing of simultaneous traversal by several assembly parts. The delivery point is in each case larger by a multiple factor than the maximum area of projection of a single assembly part.

Also known is a feed and untangling device of the same applicant—DE-A No. 31 35 581—which comprises two mutually independent loosening devices arranged one behind another, which comprise mechanical entraining members for the clumps or groups of assembly parts. A large number of the devices described in the foregoing has already been manufactured and applied successfully in practice. It was found however, that the known systems are not appropriate in an optimum manner for all the cases arising in practice.

OBJECTS AND SUMMARY OF THE INVENTION

The present invention has the fundamental problem of devising a method and a device of the nature defined in the foregoing, whereby even comparatively delicate parts, such as have a small diameter and consist of soft materials, may be reliably separated and fed into a required operational sequence and the forming of a partial quantity is simplified.

According to one aspect the invention comprises a feed method for assembly parts which adhere to or engangle with each other, in which separate assembly parts are extracted from a heterogenous quantity during a separating action, aligned in a predetermined position and delivered to an off-loading point, in which a partial quantity of separated assembly parts aligned in a predetermined position is formed in a scooping operation and that the assembly parts are extracted from this partial quantity single and in aligned form.

In this new method, it is advantageous that several assembly parts, comprising a partial quantity of separated assembly parts placed in the required position, are made available at the instant of extracting assembly parts which are separate and situated in a particular position. Short cadence or cycling periods are obtained thereby for the feed and extraction of assembly parts, and it is assured furthermore in the presence of faulty parts or in the absence of a separated and aligned assembly part from a reception nest, that an assembly part is available at short notice from another reception nest, so that this method is advantageous for feeding and separating assembly parts which are to be assembled or processed immediately thereafter in a fully automatic assembling machine.

Suitably the unsorted heterogenous quantity of assembly parts is conveyed over first reception nests for separated aligned assembly parts after which the unsorted quantity is conveyed into the area of other reception nests, whilst assembly parts adjacent to assembly parts contained in the reception nest are blown way, the presence of an assembly part in a reception nest being detected and the reception nest being held in a withdrawal position and separated and aligned assembly parts are extracted from the reception nest.

Because the parts are constantly moved back and forth across the reception nests, these parts may be intercepted in reception nests arranged in recessed manner and may thereby be separated as well as aligned. Consequently, it is possible in an uncomplicated manner to have aligned and separated assembly parts available for extraction after each pivoting action.

Suitable the partial quantity is placed in oscillation and the partial quantity is separated into separately aligned assembling parts.

The advantage consists in that the partial quantity of the assembly parts is kept loose and that compacting of said parts is averted.

According to another aspect the invention comprises a device for the feed of assembly parts, comprising a container for reception of an unsorted heterogenous quantity of assembly parts, a scooping device for assembly parts with an associated drive and an extractor device for aligned separated assembly parts, for application of the method in which the scooping device is situated inside the container in the region of the container base and comprises several reception nests for successive reception of a partial quantity formed by several separated and aligned assembly parts, and that at least one reception nest is situated at a withdrawal position in the area of the extractor device and at least one other reception nest is situated at a filling position spaced apart from the withdrawal position.

The advantage of this invention device consists in that it is not only a single assembly part which is made available for extraction in a separated and aligned manner, but that a partial quantity of separated and aligned assembly parts is available in each case. This partial quantity may be formed by the fact that the scooping device comprises several reception nests, so that several separated and aligned assembly parts are always available between the unsorted stack and the extractor device.

In a particular embodiment the container is constructed in the manner of a tub and is pivotally journalled about a pivot spindle and that the scooping device comprises scooping ribs extending transversely of the pivot spindle and situated on the container base, the ribs each comprising a reception nest for a separated assembly part in areas adjacent each of opposite ends of the container.

The unsorted quantity of assembly parts may be carried over the reception nests reciprocatingly by simple pivoting back and forth about a pivot spindle.

Suitably the scooping ribs project from the container base and the reception nests each have a reception surface extending obliquely to the container base, which extends at right angles to a plane running approximately through the middle of the reception surface and the axis of the pivot spingle, the reception surfaces of the reception nests of a scooping web adjacent the opposite ends being arranged in mirror symmetry with respect to a straight line extending at right angles to the container base and through the centre of the pivot spindle.

As a result, the extraction of separated assembly parts may occur simply in a vertical direction at the momentary terminal positions of the pivotal displacement.

Suitably nozzle bores are incorporated directly adjacent to the reception surfaces. They extend approximately parallel to the reception surfaces and are offset at right angles to the reception surface by a distance approximately corresponding to the thickness of the assembly parts.

Other assembly parts which may possibly be resting on a separated assembly part present in a reception nest may be blow off, so that the extraction of the separated assembly part is not impeded. At the same time, even assembly parts possible remaining within the marginal area of the reception nest, in particular if these consist of very soft and greasy materials like tin solder or the like, are removed by the air jet, and that a loosening of the assembly parts in the container is obtained at the same time at the deeper scooping position at which are situated the heterogenous quantity of assembly parts.

The scooping device may be formed by grooves extending obliquely to the pivot spindle of the container and situated in the container base, the widths of the grooves substantially corresponding to a principal dimension of the assembly parts, and the lengths of the grooves correspond to a multiple of another principal dimension, and nozzle bores for air supply pipes and vacuum take-off lines are situated in the reception surfaces.

An uncomplicated and expeditious loading of the reception nests with assembling parts is obtained by the sliding of the unsorted quantity of assembly parts over the container base and thereby over the reception nests arranged recessed in the same.

Suitably several grooves situated in a row parallel to the pivot spindle of the container form a scooping device and such a scooping device is situated close to each of the ends of the container base.

The container is suitably provided below its base with a coupling member formed by a dovetail guide, which is secured releasably in a matching coupling element installed on the pivot spindle, the two coupling members being interconnectible by means of a fastening device.

The container may rapidly be separated from the driving system or from the pivot spindle, for cleaning its internal suraces, whilst nevertheless retaining the positioning of the separate reception nests with respect to the extraction positions of an extractor device thanks to the precise guiding action.

A rocking drive for the pivot spindle is formed by a double-acting fluid pressure cylinder, and stops are arranged at opposite sides of the spindle such that when the container bears on a stop, the reception nests close to one end of the container extend approximately horizontally and the acceptable pivoting angle of the container determined by the stops corresponds to an angle between the two planes each extending through the pivot axis and the reception nests at a respective end of the container.

A rapid setting and adjustment of the reception nests to the extraction position of the extractor device is obtained by this means.

BRIEF DESCRIPTION OF THE DRAWINGS

The invention will now be described, by way of example, with reference to the accompanying partly diagrammatic drawings, in which:

FIG. 2 is a sectional side elevation of the device of FIG. 1;

FIG. 3 is a plan view of the device of FIGS. 1 and 2;

FIG. 4 is a transverse cross-section of device of FIGS. 1 to 3 taken along the line IV—IV in FIG. 2, and with a container base of the device situated in a horizontal position;

DETAILED DESCRIPTION OF THE PREFERRED EMBODIMENTS

Figure 1:
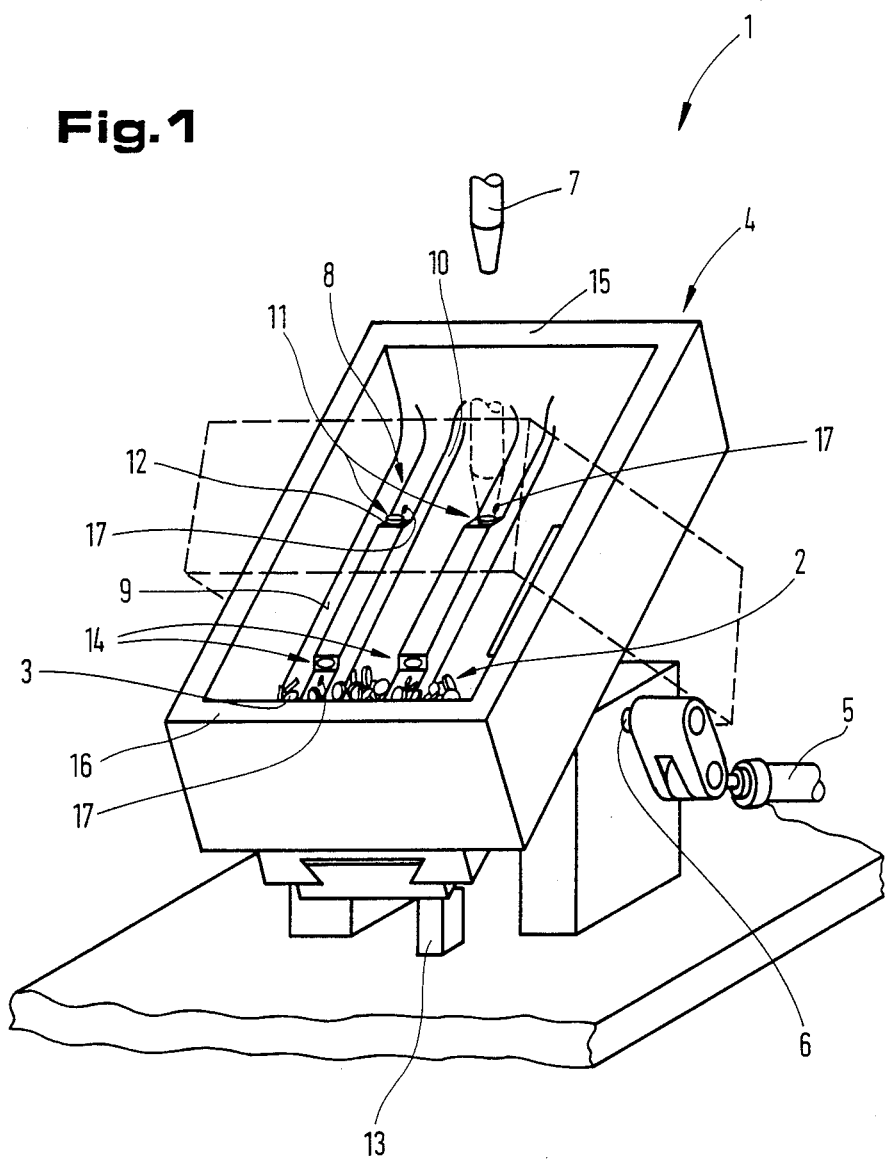
FIG. 1 is a perspective view from above and to one side of a device for separating adhered or entangled assembly parts.
Figure 5:
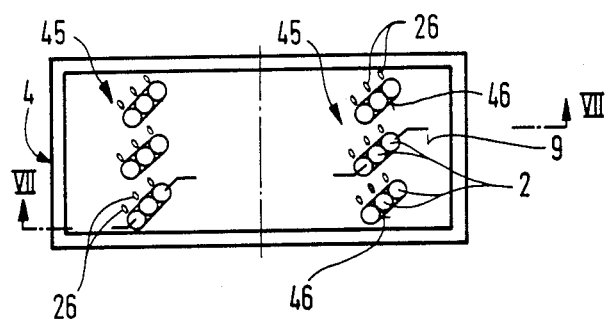
FIG. 5 is a plan view of a container of a modified embodiment of the invention.

A device 1 for supplying assembly parts 2 which adhere to or entangle with each other, for example solder tags 3, is shown in FIG. 1. A high proportion of the material of these solder tags 3 consists of soldering tin which is very soft, and the detritus sticking to the inner sides of the container causes adhesion of the parts, or the parts stick to each other very easily, in view of their soft surfaces.

The device 1 comprises a container 4 which is pivotally mounted on a pivot spindle 6 coupled to a rocking drive 5. The container 4 is positioned below an extractor device 7, e.g. a suction pickup, by means of which separated and aligned assembly parts 2 or solder tags 3 may be extracted from the container 4.

Within the container 4 is disposed a scooping device 8 formed by elongate scooping webs 10 raised with respect to a container base 9 and extending transversely with respect to the spindle 6. Reception nests 11 having reception surfaces 12 are arranged along scooping webs, several reception nests being closely adjacent and the assembly parts which are separated and aligned therein forming a partial quantity.

If the container 4 is in the position shown by solid lines, in FIG. 2, which is delimited by means of a preferably presettable stop 13, a row of reception nests 11 receiving a partial quantity of separated and aligned assembly parts are situated in an extraction position facing towards the extractor device 7. As indicated diagrammatically, another row of reception nests 14 is situated in a region of the container base 9 close to an end wall 16 of the container 4, whereas the one row of nests 11 is arranged close to the opposite end wall 15. As shown diagrammatically, the unsorted quantity of assembly parts 2 or solder tags 3 is disposed in the region of the other row of reception nests 14. The other reception nests 14 are thus placed in a loading position, the assembly parts having slipped downwards along the container base 9 upon tipping the container 4 upwards into the position shown by solid lines, to ensure that new assembly parts 2 may enter the empty reception nests 14.

If the container 4 is thereupon pivoted into the opposed position by means of the drive 5—denoted by broken lines—by means for example of a pneumatically or hydraulically operated piston-cylinder system or of an equivalent electrical or mechanical drive, the parts 2 are caused to slide downwards in the direction because of the opposed slope of the container base 9, assembly parts 2 have the reception nests being empty since the previously been removed by means of the extractor device 7 from the nests 11. Unless they have already slid into the reception nest during the preceding pivotal displacement, such assembly parts may slide into the reception nests whilst the assembly parts 2 or solder tags 3 slide over the reception nests 14, and are separated and aligned thereby.

Additional assembly parts situated in the area of the separated assembly parts 2 present in the reception nest 11 or 14, may be blown away or off the top of the separated assembly parts 2 by means of nozzle bores 17 or air inflow openings or the like arranged in the scooping webs 10 and adjacent to the reception nests.

It is more clearly apparent from FIGS. 2 and 3 that reception nests 11 and 14 are situated sideby-side in rows in areas of the container base 9 adjacent to the two end walls 15 and 16, the reception nests 11 and 14 arranged side-by-side in rows being situated in planes 18 extending through the centre of the reception surfaces 12 of the reception nests 11 and 14 and an axis of the pivot spindle 6 with which the rows are parallel. The reception surfaces 12 are arranged substantially at right angles and substantially symmetrically with respect to the planes 18. An angle 19 subtended between the planes 18 corresponds to the pivoting range of the container 4 which is advantageously determined by means of vertically adjustable stops 20 at opposite sides of the pivot spindle 6.

The scooping webs 10 project from the container base 9, a surface area 21 extending between the two reception nests 11,14 of a scooping web 10 having a greater distance 22 from the container base 9 than a distance 23 between the container base 9 and adjacent surface areas 25 joining the reception nests 11,14 to the end walls 15,16 via concave transition surfaces 24 merging arcuately and upwardly into the end walls 15,16.

The difference in height of the two surface areas 21 and 25, with respect to the container base 9, suitable corresponds approximately to the length of a projection extending ar right angles to the container base of an assembly part 2 on the reception surface 12 extending obliquely to the container base 9.

Nozzle bores 17 situated at a distance 27 in the direction of the longitudinal extension of the plane 18 from the reception surfaces 12 corresponding approximately to the thickness of the assembly parts 2 or solder tags 3 are arranged in the surface areas 25. If compressed air is blown in from a pipe 28 via these nozzle bores 17, the assembly parts which lie for example on top of the separated and aligned assembly parts contained in the reception nests 11,14, as well as the assembly parts directly adjacent thereto, may be blown off.

At the same time, it is also possible to install bores 29 in the reception surfaces 12. These may optionally be connected to a compressor 31 or to a vacuum pump 32, via a control valve 30. For example, it is possible thereby to feed compressed air to the reception nests 11,14 via the pipes 28 right after the extracting operation and to remove possibly still unextracted assembly parts 2 from these, to allow of recharging the reception nests 11,4, with assembly parts. At the same time, the pipe 28 may then be connected to the vacuum pump 32 during the loading operation or in the loaded position and until the extracting operation, so that it may be determined by means of a pressure switch 33 situated in the vacuum line whether a separated and aligned assembly part is contained in each of the reception nests 11 or 14. If this is not the case, for example, the container 4 may be immediately pivoted again so that the appropriate required partial quantity of separated and aligned assembly parts 2 may be provided to the extractor device 7 for extraction. It is evidently also possible for the pipe 28 to be acted upon solely via a pressure switch 33 by the vacuum pump 32.

Thanks to the concavely extending transition of the areas of the container base 9 situated between the individual scooping webs, as well as of the transition extensions 24,25 to the end walls 15 and 16, an accumulation or jam of the assembly parts during the reciprocating pivoting of the container is prevented and a uniform conveying of assembly parts throughout the container base 9 is assured.

It is apparent from FIG. 3 that three scooping webs 10 are arranged side-by-side in the longitudinal direction of the pivot spindle 6, and are provided with reception nests 11 and 14 in each of the terminal portions facing towards the end walls 15 and 16. As shown diagrammatically in FIG. 2, these reception nests may be set back in the direction of the container base 9 with respect to the straight line connecting the surface areas 21 and 25, to assure a safe stowage of the separated and aligned assembly parts in the reception nests.

It is shown in FIG. 4 that the scooping webs 10 are provided with lateral surfaces extending obliquely downwardly and outwardly to the container base 9 from the surface areas 21 and 25. Assembly parts 2 present beside the reception nests 11 are thereby caused to slide reliably towards the container base 9 and the extraction of the separated and aligned assembly parts 2 is not impeded. Also apparent from FIG. 4 are two coupling members 34,35 of the connecting and securing device for the container 4 which comprise a dovetail guide system, the coupling member 35 being installed on the pivot spindle 6 and coupled to the drive 36. To assure a uniform seat of the containers 4 on the coupling member 35, the coupling member 34 may be retained in its appropriate scheduled position by means of a screw 37 or a like fastening device.

Figure 6:
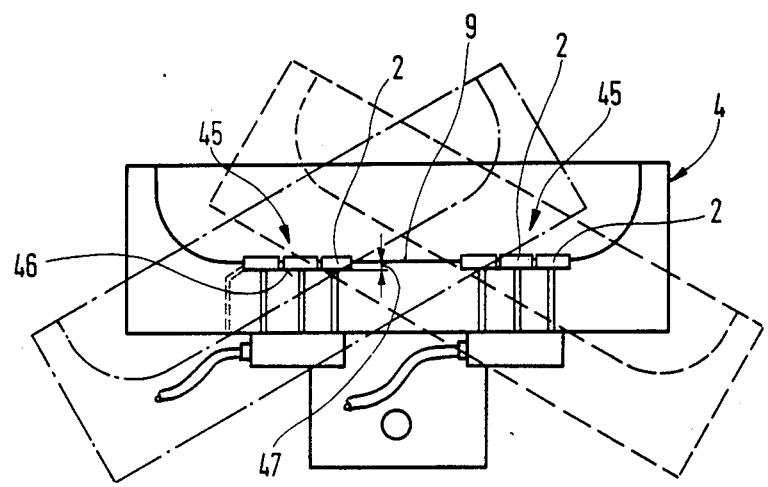
FIG. 6 is a sectional side elevation taken along the lines VII—VII in FIG. 5.

Another modified embodiment of a scooping device 45 within a container 4 is shown in FIGS. 6 and 7. The scooping device 45 is formed by a depression comprised by reception nests 46 in the container base 9. Two rows of scooping devices 45 are again provided, in each case one in the region of each of the two end sides of the container. The reception nests 46 have allocated to them laterally arranged nozzle openings 17 so that assembly parts which are immediately adjacent to or resting on the separated assembly parts may be removed by being blown off.

It is more clearly apparent from FIG. 7 that the extraction of the separated assembly parts 2 contained in the reception nests 46 is possible in each case when the container 4 is situated in a horizontal position, as shown by solid lines. Once the separated assembly parts 2 have been extracted, the container must be pivoted initially into the pecked or dash-dotted position, then into the opposed pivotal position and then back to the horizontal position shown by solid lines. The reciprocating pivotal displacement causes the unsorted quantity of assembly parts 2 to slide along the container base 9 and over the reception nests 46 of the two scooping devices 45, and individual assembly parts 2 drop into the reception nests 46 from which they may be extracted by means of the extractor device 7. In this case too, it is again possible to allocate bores to the individual positions of the assembly parts in the reception nests 46, so that use may be made of a vacuum reading to determine whether assembly parts 2 are present or absent in the reception nests 46. Assembly parts present in the marginal area of the reception nests 46 or lying on the already separated assembly parts may be blown away by means of the nozzle bores 26 positioned laterally with respect to the reception nests 46, so that the extraction of the assembly parts by means of the extractor device is not impeded.

The container 4 should in each case be placed in a level or horizontal position, for extraction of the separated assembly parts. Thanks to the incorporation of two scooping devices in the mutually opposed end portions of the container 4, it is also possible to allow of the loading of at least the reception nests 46 of one scooping device by means of one pivotal displacement only, for example into the pecked or dash-dotted position.

It is also apparent from FIG. 7 that reception surfaces 47 of the scooping devices 45 are set deeper compared to the adjacent areas of the container base 9. A depth 48 along which the reception surfaces 47 are downwardly displaced compared to the container base 9, preferably amounts to a part only of the thickness of the assembly parts 2. As a result the retained assembly parts are kept in the separated and aligned position and the retention of other assembly parts 2 above them is largely avoided.

The container may be produced in an optioanl form, and the reception nests may be arranged in scooping webs extending obliquely, as shown in FIG. 6, to the pivot spindle, or to select a different structure for the scooping webs or the reception nests. The construction of the drive for the pivoting of the container or of the scooping wheel is not restricted.

What is claimed is:

1. A method of feeding single and aligned assembly parts which tend to adhere to, or become entangled with, each other, which comprises the steps of
   (a) placing an unsorted heterogenous quantity of the adhering and entangled assembly parts next to a first reception nest for a respective one of the singled and aligned assembly parts,
   (b) cyclically slidingly conveying at least a portion of the unsorted heterogenous quantity of the assembly parts in a conveying direction over the first reception nest and towards a second reception nest remote from the first reception nest in the conveying direction for a respective other one of the singled and aligned assembly parts whereby the one singled and aligned assembly part is retained in the first reception nest while other assembly parts of said quantity of assembly parts slide past the second reception nest,
   (c) cyclically blowing away any assembly parts in contact with the one singled and aligned assembly part in the first reception nest,
   (d) cyclically extracting the one singled and aligned assembly part from the first reception nest.
   (e) cyclically slidingly conveying the conveyed other assembly parts of the quantity of the assembly parts over the second reception nest and toward the first reception nest whereby the other one singled and aligned assembly part is retained in the second reception nest while the other assembly parts slide past the first reception nest,
   (f) cyclically blowing away any assembly parts in contact with the other one singled and aligned assembly part in the second reception nest, and
   (g) cyclically extracting the other one singled and aligned assembly part from the second reception nest.

2. The method of claim 1, wherein the one and the other one of the singled and aligned assembly parts are extracted by suction.

3. An apparatus for feeding single and aligned assembly parts which tend to adhere to, and become entangled with, each other, which comprises
   (a) a container having two end walls and a base extending therebetween,
   (b) an elongated scooping device in the region of the container base and centered between the end walls, the scooping device having opposite end regions remote from each other in the conveying direction and respectively adjacent opposite end walls of said container,
   (c) a first reception nest for a respective one of the singled and aligned assembly parts arranged in one of the scooping device end regions and a second reception nest for a respective other one of the singled and aligned assembly parts arranged in the opposite scooping device end region, a space being defined between each one of the reception nests and the respective adjacent one of the end walls for receiving an unsorted heterogenous quantity of the adhering and entangled assembly parts,
   (d) means for alternatingly displacing respective portions of the quantity of assembly parts between said spaces over the scooping device whereby the one and the other one of the singled and aligned assembly parts is retained alternatingly in the first and the second reception nest while other assembly parts of said quantity are alternatingly conveyed to the respectively opposite one of said spaces,
   (e) means at each one of the reception nests for blowing away any assembly parts in contact with the singled and aligned assembly parts, and
   (f) extractor means for extracting the singled and aligned assembly parts from the reception nest.

4. The apparatus of claim 3, wherein the container is tub-shaped and the container base has projecting, elongate scooping webs extending between the end walls and constituting the scooping device, the container being pivotal about an axis extending perpendicularly to the scooping webs, and the scooping webs defining the first and second reception nests respectively adjacent the opposite end walls.

5. The apparatus of claim 4, wherein the reception nests have a reception surface extending obliquely to the container base, the reception surface extending perpendicularly to a plane extening substantially through the center of the reception surface and the pivoting axis, and parallel to the axis.

6. The apparatus of claim 5, further comprising a bore in the reception surface for supplying or withdrawing air therefrom.

7. The apparatus of claim 5, wherein the reception surfaces of the reception nests respectively adjacent the opposite end walls are arranged mirror-symmetrically with respect to a line extending perpendicularly to the container base through the center of the pivoting axis.

8. The apparatus of claim 5, wherein said space comprises a concave transition surface connecting the container base to the each end wall and forming a smooth surface transition beteen adjacent surfaces of the base and the end wall.

9. The apparatus of claim 8, further comprising nozzle bores arranged immediately adjacent the reception surfaces and extending substantially parallel thereto, the nozzle bores being perpendicularly spaced from the adjacent reception surfaces by a distance corresponding substantially to the thickness of the assembly parts.

10. The apparatus of claim 9, wherein the nozzle bores are arranged in the surface areas connecting the reception surfaces with the concave transition surfaces.

11. The apparatus of claim 5, further comprising a first coupling member defining a dovetailed guide and attached to an outer surface of the container base, a second coupling member detachably mounted in the dovetailed guide and attached to a pivoting axle extending in the direction of the pivoting axis, and a fastening member detachably connecting the coupling members to each other.

12. The apparatus of claim 11, further comprising a double-acting, pressure fluid operated pivoting drive connected to the second coupling member, and two stops so arranged in the pivoting path of the container upon operation of the pivoting drive that, upon engagement of the container with a respective one of the stops, a respective one of the reception surfaces of one of the reception nests adjacent a respective one of the end walls extends substantially horizontally.

13. The apparatus of claim 3, wherein the extractor means is a suction device.

* * * * *